United States Patent [19]

Diedrich et al.

[11] Patent Number: 4,745,570
[45] Date of Patent: May 17, 1988

[54] BINARY MULTIBIT MULTIPLIER

[75] Inventors: Richard A. Diedrich; Jay A. Lawrence, both of Rochester, Minn.

[73] Assignee: International Business Machines Corporation, Armonk, N.Y.

[21] Appl. No.: 867,167

[22] Filed: May 27, 1986

[51] Int. Cl.⁴ ............................................. G06F 7/52
[52] U.S. Cl. ................................................... 364/760
[58] Field of Search ........................................ 364/760

[56] References Cited

U.S. PATENT DOCUMENTS

| | | | |
|---|---|---|---|
| 4,041,292 | 8/1977 | Kindell | 364/760 |
| 4,153,938 | 5/1979 | Ghest et al. | 364/760 |
| 4,484,301 | 11/1984 | Borgerding | 364/760 |
| 4,646,257 | 2/1987 | Essig et al. | 364/760 |

OTHER PUBLICATIONS

Beraud et al., "Parallel Multiplier", IBM Tech. Disclosure Bulletin, vol. 24, No. 11B, Apr. 1982, pp. 6090–6092.

Primary Examiner—David H. Malzahn
Attorney, Agent, or Firm—J. Michael Anglin

[57] ABSTRACT

A digital multiplier has recoders for recoding the multiplier bits to form selection bits which are applied to selectors for selecting forms of the multiplicand, either the multiplicand itself or multiples of the multiplicand, the selected forms being applied to adders which produce partial products, the adders being interconnected to produce the product. Special product generators simultaneously generate multiples of the multiplicand which are applied to the selectors.

10 Claims, 7 Drawing Sheets

| M X 3 | MULTIPLICAND ADDED TO ITSELF SHIFTED ONCE |
|---|---|
| M X 5 | MULTIPLICAND ADDED TO ITSELF SHIFTED TWICE |
| M X 7 | MULTIPLICAND SUBTRACTED FROM ITSELF SHIFTED LEFT THREE PLACES |

FIG. 9

| M X 1 | MULTIPLICAND |
|---|---|
| M X 2 | MULTIPLICAND SHIFTED LEFT 1 PLACE |
| M X 3 | M X 3 |
| M X 4 | MULTIPLICAND SHIFTED LEFT 2 PLACES |
| M X 5 | M X 5 |
| M X 6 | M X 3 SHIFTED LEFT 1 PLACE |
| M X 7 | M X 7 |
| M X 8 | MULTIPLICAND SHIFTED LEFT 3 PLACES |

FIG. 10

| I4 | I3 | I2 | I1 | I0 | |
|---|---|---|---|---|---|
| 0 | 0 | 0 | 0 | 0 | 0 |
| 0 | 0 | 0 | 0 | 1 | MULTIPLICAND X 1 |
| 0 | 0 | 0 | 1 | 0 | MULTIPLICAND X 1 |
| 0 | 0 | 0 | 1 | 1 | MULTIPLICAND X 2 |
| 0 | 0 | 1 | 0 | 0 | MULTIPLICAND X 2 |
| 0 | 0 | 1 | 0 | 1 | MULTIPLICAND X 3 |
| 0 | 0 | 1 | 1 | 0 | MULTIPLICAND X 3 |
| 0 | 0 | 1 | 1 | 1 | MULTIPLICAND X 4 |
| 0 | 1 | 0 | 0 | 0 | MULTIPLICAND X 4 |
| 0 | 1 | 0 | 0 | 1 | MULTIPLICAND X 5 |
| 0 | 1 | 0 | 1 | 0 | MULTIPLICAND X 5 |
| 0 | 1 | 0 | 1 | 1 | MULTIPLICAND X 6 |
| 0 | 1 | 1 | 0 | 0 | MULTIPLICAND X 6 |
| 0 | 1 | 1 | 0 | 1 | MULTIPLICAND X 7 |
| 0 | 1 | 1 | 1 | 0 | MULTIPLICAND X 7 |
| 0 | 1 | 1 | 1 | 1 | MULTIPLICAND X 8 |

| I4 | I3 | I2 | I1 | I0 | |
|---|---|---|---|---|---|
| 1 | 0 | 0 | 0 | 0 | MULTIPLICAND X -8 |
| 1 | 0 | 0 | 0 | 1 | MULTIPLICAND X -7 |
| 1 | 0 | 0 | 1 | 0 | MULTIPLICAND X -7 |
| 1 | 0 | 0 | 1 | 1 | MULTIPLICAND X -6 |
| 1 | 0 | 1 | 0 | 0 | MULTIPLICAND X -6 |
| 1 | 0 | 1 | 0 | 1 | MULTIPLICAND X -5 |
| 1 | 0 | 1 | 1 | 0 | MULTIPLICAND X -5 |
| 1 | 0 | 1 | 1 | 1 | MULTIPLICAND X -4 |
| 1 | 1 | 0 | 0 | 0 | MULTIPLICAND X -4 |
| 1 | 1 | 0 | 0 | 1 | MULTIPLICAND X -3 |
| 1 | 1 | 0 | 1 | 0 | MULTIPLICAND X -3 |
| 1 | 1 | 0 | 1 | 1 | MULTIPLICAND X -2 |
| 1 | 1 | 1 | 0 | 0 | MULTIPLICAND X -2 |
| 1 | 1 | 1 | 0 | 1 | MULTIPLICAND X -1 |
| 1 | 1 | 1 | 1 | 0 | MULTIPLICAND X -1 |
| 1 | 1 | 1 | 1 | 1 | 0 |

FIG. 11

BINARY MULTIBIT MULTIPLIER

BACKGROUND OF THE INVENTION

1. Field of the Invention

This invention relates to binary multibit multipliers and more particularly to such multipliers which use recoding.

The invention finds particular utility in signal processors and other computer systems and is particularly adapted to be integrated into the device producing the signals to be processed such as I/0 controllers and microprocessors as well as in large computer systems.

2. Description of the Prior Art

Digital multipliers for multiplication of signed binary numbers are generally slow and require large amounts of circuitry as the size, i.e. the number of inputs, increases. This is because as the size increases the number of adders required or the complexity thereof for implementation of the multiplier increases. Therefore it is desirable to devise some way to reduce the number of additions required to complete the multiplication and to do so in a simple manner to keep multiplication time and circuitry to a minimum. Recoding of the binary inputs can reduce the number of additions required to complete the multiplication because two or more bits of the multiplier can be recoded so as to require only one addition for the recoded bits rather than an addition for each bit of the multiplier. Also, recoding allows positive and negative multipliers to be treated in the same manner. Bit pair recoding has been used in the past and it only requires simple shifts and/or complements of the multiplicand. Recoding schemes larger than bit pair recoding become more complex and require more forms of the multiplicand to be available to the rows of adders. The present invention uses four bit recoding and generates all multiples of the multiplicand in a manner to minimize circuit area and to provide a speed advantage. This is accomplished by generating all multiples of the multiplicand in a unique manner whereby simple adders, i.e. adders capable of forming the sum of two binary numbers rather than adders which can add three binary numbers at the same time, are used.

SUMMARY OF THE INVENTION

The principal object of the present invention is to provide an improved multiplier for multiplying signed binary numbers coded in two's complement form using four bit recoding in a manner so as to minimize circuit area and maximize speed at a relatively low cost. Another significant object of the invention is to provide an improved multiplier for multiplying signed binary numbers which continues to minimize circuit area and maximize speed as the size of the multiplier increases. This is accomplished by forming all needed multiples of the multiplicand in a manner whereby the overhead for doing so does not substantially increase as the size of the multiplier increases. The multiples of the multiplicand which can not be obtained by simple shifts are considered special products which are generated at the same time that the multiplier bit recoding is being done.

DESCRIPTION OF THE INVENTION

Figure 1:
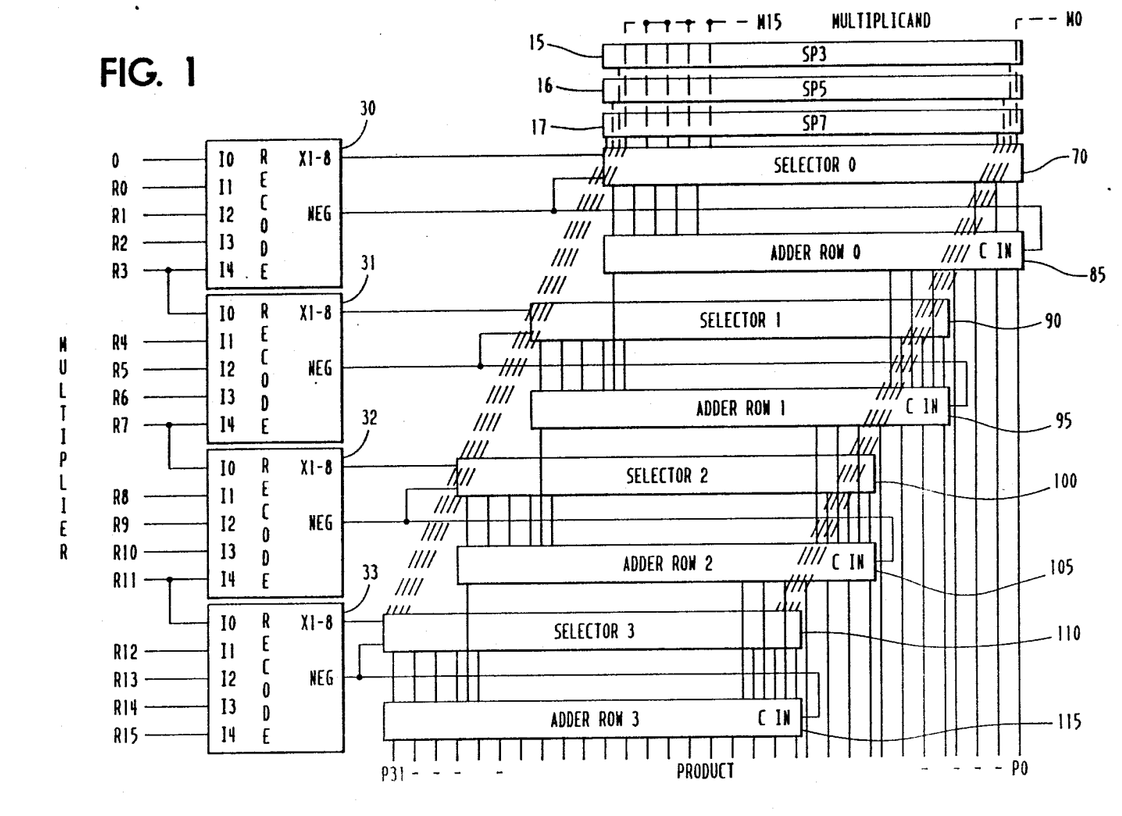
FIG. 1 is a schematic diagram showing the invention as being embodied in a 16 by 16 bit multiplier array.

With reference to the drawings and particularly to FIG. 1, the invention is illustrated by way of example where the multiplicand is simultaneously applied to special product generators 15, 16, and 17, and the 16-bit multiplier is applied to recoders 30, 31, 32, and 33 respectively. The special product generators 15, 16, and 17 are twenty bit adders. The special products generator 15 is shown in detail in FIG. 2 and functions to generate an output which is three times the multiplicand. The low order bit position of special products generator 15 has a forced zero signal applied to input terminal 21 and a force carry in signal applied to input terminal 22. The low order bit position of the multiplicand is applied to bit positions 0 and 1 of the special products generator 15. Similarly, the other bits of the multiplicand are applied to the corresponding bit positions and the next higher bit position of the special products generator 15. Additionally, bit 15 of the multiplicand is applied to both inputs of bit positions 16, 17, 18, and 19 of the special products generator. By applying the bits of the multiplicand in this manner to the inputs of the special products generator 15, the output from special products generator 15 is three times the multiplicand. The special products generator 15 functions to add the multiplicand to the multiplicand which has been shifted once. Of course, no shifting takes place dynamically because the multiplicand is applied to the special products generator 15 in shifted form. The special products generator 15 has a 20-bit output, and thus it is necessary to connect the high order bit position of the multiplicand in the manner described in order to extend the sign bit of the multiplicand. The outputs of the special products generator 15 are applied as inputs into selectors 70, 80, 100, and 110 in a manner which will be described in greater detail later herein.

Figure 2:
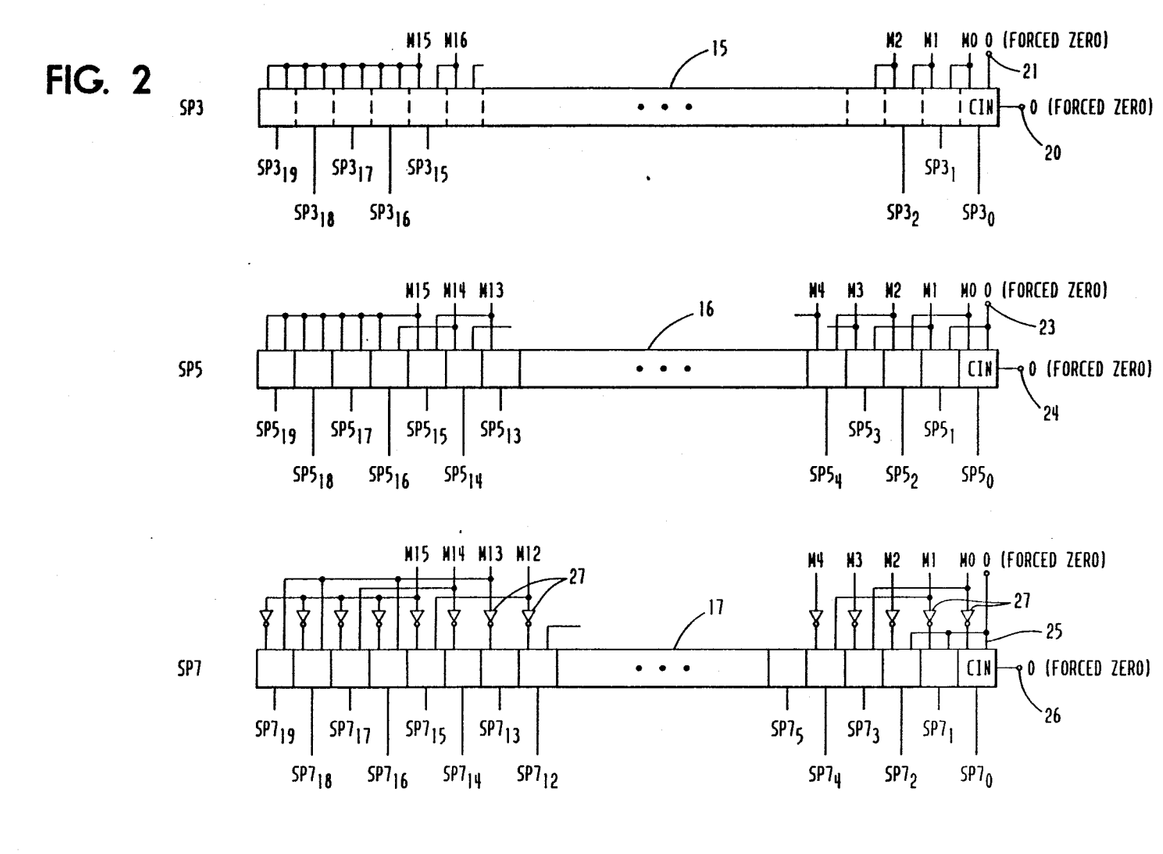
FIG. 2 is a schematic diagram illustrating the special product generators for three times, five times, and seven times multiples of the multiplicand.

The special products generator 16 functions to generate a multiple which is five times the multiplicand. Thus, a forced zero is applied to terminal 23 and to an input of the next higher order position as inputs into the low order and the next to the low order bit positions of the special products generator 16. A forced zero is applied to input terminal 24 connected to the low order bit position of the special products generator 16. The low order bit of the multiplicand is applied to the low order bit position and to the bit position two positions away from the low order bit position. The other bits of the multiplicand are applied to the special products generator 16 in a similar manner, and the high order bit position is applied to bit positions 15, 16, 17, 18, and 19 of the special products generator 16. The special products generator 16 in essence adds the multiplicand to the multiplicand shifted twice. The multiplicand is applied to the special products generator 16 in the shifted form, and as previously indicated, no shifting takes place dynamically. The outputs of the special products generator 16 are applied to the selectors 70, 90, 100, and 110 in a manner which will be described in a manner herein.

The special products generator 17 functions to form a multiple which is seven times the multiplicand. The multiplicand is applied as inputs into the special products generator 17 along with the multiplicand in shifted form three places to the left. However, in this instance the multiplicand is subtracted rather than added to the shifted form of the multiplicand because the shift provides a multiple which is eight times the multiplicand. The subtraction is accomplished by inverting the multiplicand through inverters 27 and a forced 1 is applied to the carry in input terminal 26. A forced 0 is applied to terminal 25 which is connected to the first three low order positions of the special products generator 17. The bits of the multiplicand are applied to the corresponding bit positions of the special products generator 17 via inverters 27 and in a noninverted form to bit positions three positions to the left of the corresponding bit input position. The high order bit of the multiplicand is applied through inverters to bit positions 15, 16, 17, 18, and 19.

The outputs of the special products generator 17 are applied to the selectors 70, 90, 100, and 110. The selectors 70, 90, 100, and 110 are identical but are connected to different decoders i.e. selector 70 is connected to recoder 30, selector 90 is connected to recoder 31, selector 100 is connected to recoder 32 and selector 110 is connected to recoder 33. Each selector has 20 bit positions, and each bit position includes a group of AND circuits 71 to 78 inclusive where AND circuit 71 has an X1 control or selector input from the associated recoder and an input from the multiplicand.

Figure 5:
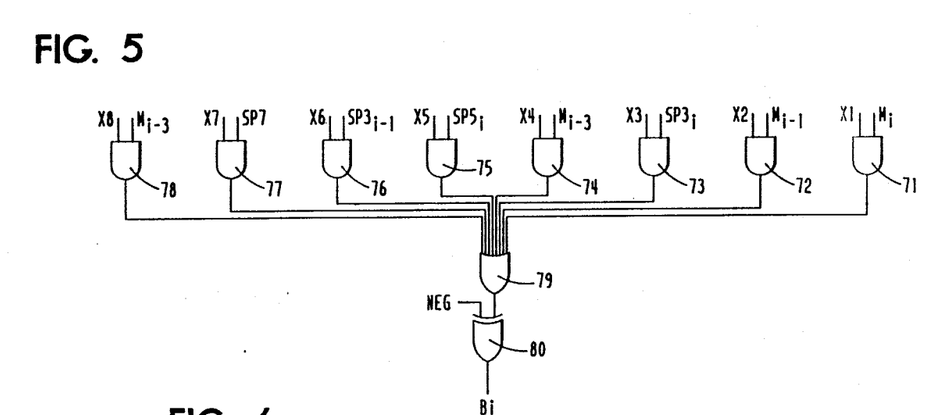
FIG. 5 is a schematic logic diagram illustrating one bit of a selector circuit.

Logical and circuit 72 has an X2 input from the associated recoder and a bit one bit position to the right of the multiplicand bit input to AND circuit 71. Logical AND circuit 73 has a X3 control input from the associated recoder and a bit from the special products generator 15. Logical AND circuit 74 has a X4 input from the associated recoder and a bit two places to the right of the multiplicand input into logical AND circuit 71. Logical AND circuit 75 has a X5 input from the associated recoder and a bit from special products generator 16. Logical AND circuit 36 has a X6 input from the associated recoder and a bit one position to the right of the bit from the special products generator 15 which is applied to logical AND circuit 73. Logical AND circuit 77 has an X7 input from the associated recoder and a bit from the special products generator 17. The logical AND circuit 78 has a X8 input from the associated recoder and a multiplicand input which is three places to the right of the multiplicand input into logical AND circuit 71.

Figure 6:
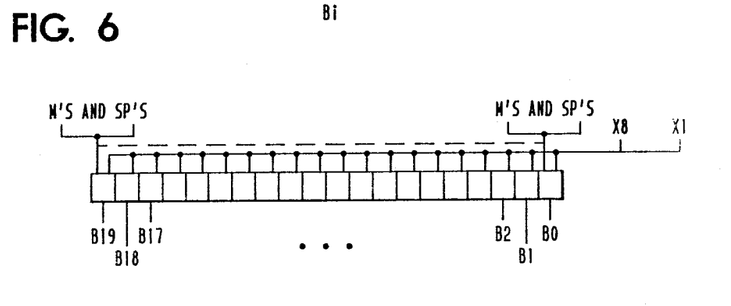
FIG. 6 is a schematic diagram showing a selector circuit which is 20 bits wide where the logic for each bit is as shown in FIG. 5.

The outputs of the logical AND circuits 71–78 inclusive are applied as inputs to logical OR circuit 79 which has its output connected to an input of Exclusive OR circuit 80. The other input into Exclusive OR circuit 80 is the negative or NEG line from the associated recoder. The output of Exclusive OR circuit 80 is an output of the selector and it is connected as an input to an associated adder. A selector representative of the selectors 70, 90, 100, and 110 is shown in FIG. 6.

Figure 3:
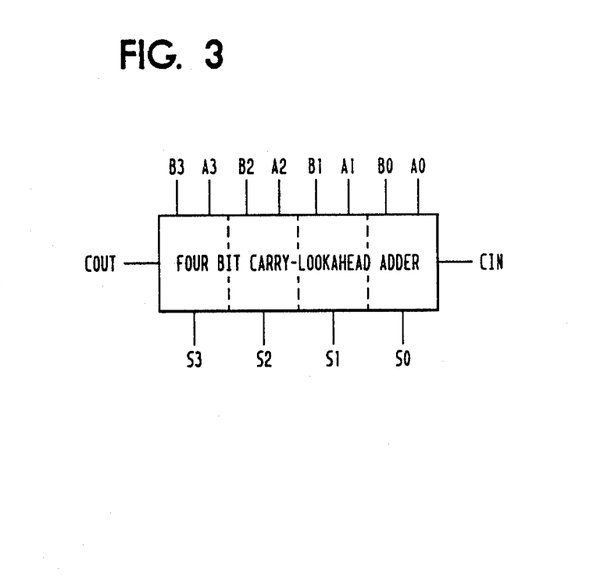
FIG. 3 is a schematic diagram of a four bit carry look ahead adder.
Figure 4:
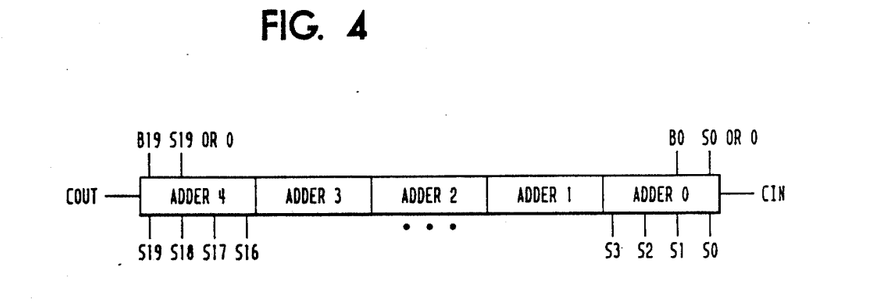
FIG. 4 is a schematic diagram illustrating a row of adders formed by combining five four-bit carry look ahead adders of FIG. 3.

The rows of adders 85, 95, 105, and 115 are conventional carry look ahead adders with carry in and carry out terminals respectively. Each row of adders is 20 bits wide as shown in FIG. 4 and the carry out signal from the high order position is ignored. The adder of FIG. 4 consists of five 4-bit adders shown in FIG. 3.

Figure 7:
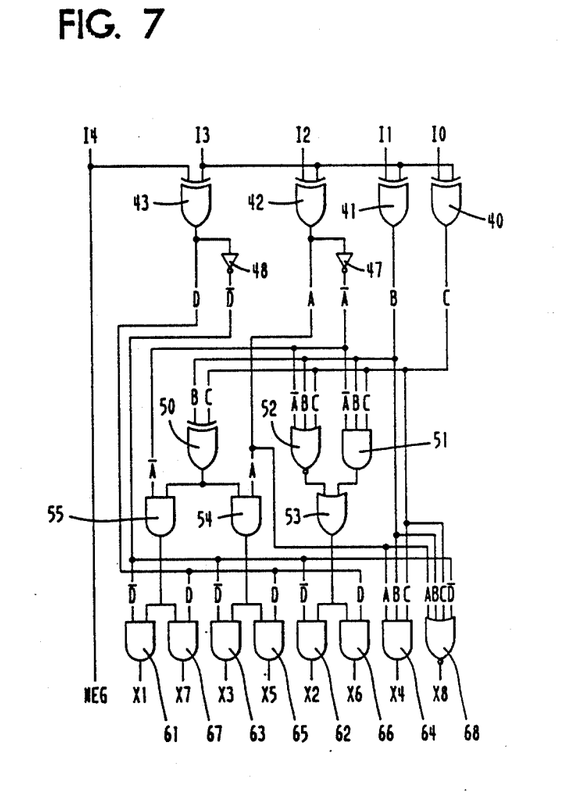
FIG. 7 is a schematic logic diagram of the recode logic for the recode logic blocks shown in FIG. 1.
Figure 8:
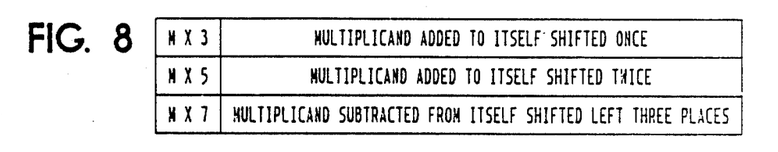
FIG. 8 is a schematic diagram illustrating a formation of special products by shifting the multiplicand and performing an arithmetic operation.
Figure 9:
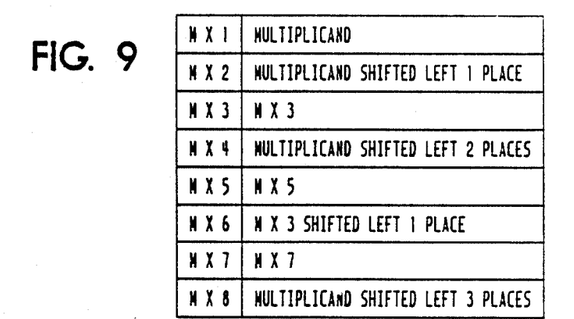
FIG. 9 is a schematic diagram illustrating multiples of the multiplicand.
Figure 10:
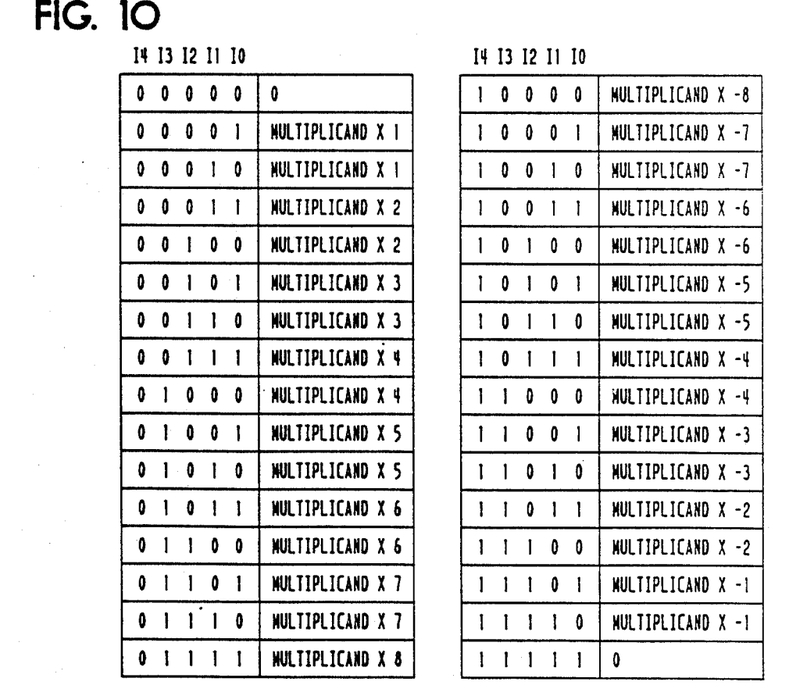
FIG. 10 is a schematic block diagram illustrating the recoding scheme.

The recoders 30, 31, 32 and 33 are identical logically. Each recoder as shown in FIG. 7 has inputs I0, I1, I2, I3, and I4. The 16 bit multiplier is partitioned into four groups of 4 bits each. The input I0 for the first or low order group of multiplier bits is connected to receive a forced 0. The high order multiplier bit of this group, i.e. R3, is applied to input I0 for recoder 31. Similarly, multiplier bits R7 and R11 are applied to inputs I0 of recoders 32 and 33 respectively. The logic for the recoders 30, 31, 32 and 33 is shown in chart form in FIG. 10. The inputs I0, I1, I2, and I4 are applied as inputs to Exclusive OR circuits 40, 41, 42, and 43 respectively. The input I3 is applied as the other input into these Exclusive OR circuits 40, 41, 42, and 43. The outputs of Exclusive OR circuits 40, 41, 42, and 43 are C, B, A, and D respectively. Not A ($\bar{A}$) Not D ($\bar{D}$) signals are formed by applying the outputs of Exclusive OR circuits 42 and 43 to inverters 47 and 48 respectively. An Exclusive OR circuit 50 has inputs from Exclusive OR circuits 40 and 41. AND circuit 51 has inputs from Exclusive OR circuit 40, Exclusive OR circuit 41, and inverter 47. NOR circuit 52 has inputs from Exclusive OR circuit 40, Exclusive OR circuit 41, and inverter 47. The outputs of AND circuit 51 and NOR circuit 52 feed OR circuit 53. Exclusive OR circuit 50 feeds AND circuits 54 and 55 which also have inputs from Exclusive OR circuit 42 and inverter 47 respectively. The X1, X2, X3, X4, X5, X6, X7, and X8 signals are from logical AND circuits 61–67 and NOR circuit 68, respectively. Exclusive OR circuit 43 feeds AND circuits 65, 66, and 67. Inverter 48 feeds AND circuits 61, 62, and 63. The output of AND circuit 55 feeds AND circuits 61 and 67, the output of AND circuit 54 feeds AND circuits 63 and 65, and the output of OR circuit 53 feeds AND circuits 62 and 66. The outputs of exclusive OR circuits 40, 41, and 42 are applied to AND circuit 64 and to NOR circuit 68. NOR circuit 68 also has an input from inverter 48. The I4 input is the negative or NEG output of the recoder.

As seen in FIG. 1, the outputs of the recoders 30, 31, 32, 33 are applied to selectors 70, 90, 100, and 110 respectively. The NEG outputs of recoders 30, 31, 32, and 33 are applied to carry in inputs of adders 85, 95, 105, and 115 respectively. The negative or NEG outputs from recoders 30, 31, 32, and 33 are also applied to selectors 70, 90, 100, and 110 respectively.

The adders 85, 95, 105, and 115 are connected in a manner whereby the high order 16 bits of adder 85 are inputs into adder 95, the high order 16 bits of adder 95 are inputs into adder 105, and the high order 16 bits of adder 105 are inputs into adder 115. The low order 4 bits of adders 85, 95, and 105 are the twelve low order bits of the product formed by the multiplier. The 20 high order bits of the product are from adder 115.

From the foregoing it is seen that multiples of the multiplicand are formed simultaneously and are applied as inputs into selectors together with the multiplicand itself where the selectors are controlled by recoders which have inputs from the multiplier. The selectors have their outputs connected to inputs of adders which form partial products where a low order adder has its outputs connected to inputs of the next higher order adder which also receives inputs from an associated selector. The highest order adder provides the high order bits of the product and each of the lower order adders provides lower order product bits, the number of bits being equal to the offset of the lower order adders i.e. in this example 4 bits.

Figure 11:
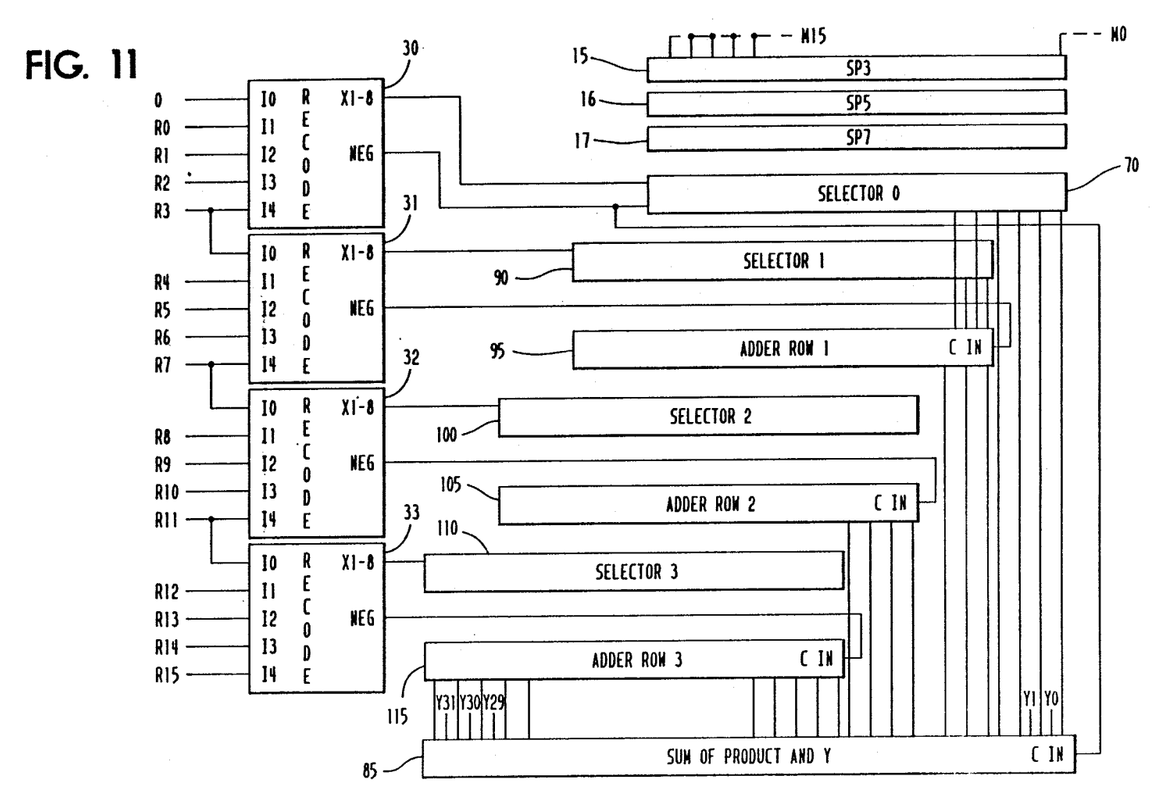
FIG. 11 is a schematic diagram of an alternate embodiment of the invention where the output is the sum of the product and a value Y.

It should be noted that adder 85 is not fully utilized as an adder and in fact is connected as an incrementor. The invention can be embodied so as to be a multiplier with a summing adder as shown in FIG. 11. In this embodiment, selector 70 feeds adders 90 and 85 where adder 85 is a 32-bit adder and its output is the sum of the product and an addend Y. Note that in this embodiment all of the adders are functioning as adders and none only as an incrementor.

While the preferred embodiment of the invention has been illustrated and described, it is to be understood that the invention is not to be limited to the precise construction herein disclosed and the right is reserved to all changes and modification coming within the scope of the invention as defined in the appended claims.

We claim:

1. A digital multiplier circuit for generating a product from multi bit inputs representing a multi bit multiplicand and a multi bit multiplier comprising:
   a plurality of special product generators having inputs for receiving predetermined bits of the multiplicand to generate therefrom outputs which are multiples of said multiplicand together with sign bits for said multiples of said multiplicand,
   a plurality of recoders for recoding at least more than two bits of said multiplier to generate selection signals for selecting different multiples of the multiplicand including the multiplicand itself,
   a plurality of selectors each connected to receive multiples of the multiplicand including the multiplicand itself and connected to receive said selection signals from said recoders; and,
   a plurality of adders connected to said selectors and the outputs of said adders being interconnected to generate the product.

2. The digital multiplier of claim 1 wherein said plurality of special products generators generate multiples of said multiplicand simultaneously.

3. The digital multiplier of claim 1 wherein said multiplicand and said multiplier are each sixteen bits and said product is thirty-two bits.

4. The digital multiplier of claim 1 wherein said adders are interconnected in a manner that a first adder of the plurality of adders has at least a portion of its output connected to the input of another adder of said plurality of adders, and the last adder of said plurality of adders has its input connected to at least a portion of the output of a preceding adder and its output is at least a portion of the output of said multiplier to provide at least a portion of the product.

5. The digital multiplier of claim 1 wherein said selectors have the same number of bits as said adders.

6. The digital multiplier of claim 1 wherein each bit position of said selectors consists of a plurality of logical AND circuits corresponding in number to the number of selection signals from one of said recoders, each logical AND circuit having an input to receive a predetermined form of the multiplicand and an input for receiving one of the selection signals from said recoders.

7. The digital multiplier of claim 1 wherein each of said recoders consists of identical logic elements.

8. The digital multiplier of claim 7 wherein each recoder has five inputs, the first input of the first recoder of said plurality of recoders is to receive a forced logical zero and the other inputs are connected to receive predetermined multiplier bits, the multiplier bit applied to the fifth input of said first recoder also being applied to the first input of the second recoder which has its other inputs connected to predetermined multiplier bits, the predetermined multiplier bit applied to the fifth input of the second recoder also being applied to the first input of the third recoder which has its other inputs connected to predetermined multiplier bits, the multiplier bit applied to the fifth input of said third recoder being also applied to the first input of the fourth recoder which has its other inputs connected to predetermined multiplier bits.

9. The digital multiplier of claim 8 wherein each recoder generates from said inputs eight selection signals and a negative control signal.

10. The digital multiplier of claim 1 wherein said plurality of recoders comprise four recoders.

* * * * *